US012791847B2

(12) United States Patent
Juskaitis et al.

(10) Patent No.: US 12,791,847 B2
(45) Date of Patent: Nov. 10, 2026

(54) MICROSCOPE

(71) Applicant: Aurox Limited, Abingdon (GB)

(72) Inventors: Rimyvdas Juskaitis, Abingdon (GB); Mark AA Neil, Abingdon (GB)

(73) Assignee: Road Bay Limited, Wolverhampton (GB)

( * ) Notice: Subject to any disclaimer, the term of this patent is extended or adjusted under 35 U.S.C. 154(b) by 635 days.

(21) Appl. No.: 18/022,858

(22) PCT Filed: Aug. 25, 2020

(86) PCT No.: PCT/GB2020/052040
§ 371 (c)(1),
(2) Date: Feb. 23, 2023

(87) PCT Pub. No.: WO2022/043644
PCT Pub. Date: Mar. 3, 2022

(65) Prior Publication Data
US 2023/0324665 A1 Oct. 12, 2023

(51) Int. Cl.
*G02B 21/00* (2006.01)
*G02B 21/06* (2006.01)
(Continued)

(52) U.S. Cl.
CPC ......... *G02B 21/18* (2013.01); *G02B 21/0032* (2013.01); *G02B 21/0036* (2013.01);
(Continued)

(58) Field of Classification Search
CPC ................ G02B 21/00; G02B 21/0004; G02B 21/0012; G02B 21/0016; G02B 21/002;
(Continued)

(56) References Cited

U.S. PATENT DOCUMENTS 5,506,725 A 4/1996 Koike et al.
5,671,085 A 9/1997 Gustafsson et al.
(Continued)

FOREIGN PATENT DOCUMENTS

CN 109061865 A 12/2018
EP 1580586 A1 9/2005
(Continued)

OTHER PUBLICATIONS

Japan Patent Office, Notice of Reason(s) for Rejection, Application No. 2023-513531, Jul. 23, 2024, 7 pages.
(Continued)

*Primary Examiner* — Thong Q Nguyen
(74) *Attorney, Agent, or Firm* — Quarles & Brady LLP; Yakov Sidorin

(57) ABSTRACT

A microscope including: a sample stage for mounting a sample; a light source for illuminating the sample when mounted on the sample stage; a detector; a first objective disposed on one side of the sample stage; a second objective disposed on an opposite side of the sample stage; a first set of optical elements defining a first light path from the first objective to the detector; and a second set of optical elements defining a second light path from the second objective to the detector. The first objective and the second objective have a common optical axis and are configured to image a sample mounted on the sample stage in a common focal plane. The first objective is a high magnification objective and the second objective is a low magnification objective enabling viewing of a sample simultaneously or quasi-simultaneously at both high and low magnifications.

19 Claims, 2 Drawing Sheets

(51) Int. Cl.
*G02B 21/18* (2006.01)
*G02B 21/36* (2006.01)

(52) U.S. Cl.
CPC ........... *G02B 21/06* (2013.01); *G02B 21/361* (2013.01); *G02B 21/367* (2013.01)

(58) Field of Classification Search
CPC ............ G02B 21/0024; G02B 21/0028; G02B 21/0032; G02B 21/0036; G02B 21/004; G02B 21/0044; G02B 21/0048; G02B 21/0052; G02B 21/0064; G02B 21/02; G02B 21/025; G02B 21/04; G02B 21/06; G02B 21/26; G02B 21/36; G02B 21/361; G02B 21/364; G02B 21/365; G02B 21/367
USPC .................................................. 359/368–398
See application file for complete search history.

(56) References Cited

U.S. PATENT DOCUMENTS

| | | | | |
|---|---|---|---|---|
| 6,144,489 | A | 11/2000 | Wilson et al. | |
| 6,687,052 | B1 | 2/2004 | Wilson et al. | |
| 9,709,786 | B2 * | 7/2017 | Fukutake | G02B 27/58 |
| 2005/0211872 | A1 | 9/2005 | Kawano et al. | |
| 2011/0109962 | A1 | 5/2011 | Cui et al. | |
| 2018/0359404 | A1 * | 12/2018 | Yonetani | H04N 23/67 |
| 2019/0391012 | A1 | 12/2019 | Kokota et al. | |

FOREIGN PATENT DOCUMENTS

| | | | |
|---|---|---|---|
| EP | 3550353 | A1 | 10/2019 |
| JP | H05288992 | A | 11/1993 |
| JP | 2002040329 | A | 2/2002 |
| JP | 2005301065 | A | 10/2005 |
| JP | 2009116317 | A | 5/2009 |
| WO | 0043819 | A2 | 7/2000 |
| WO | WO 2018/106678 | A1 * | 6/2018 |

OTHER PUBLICATIONS

China National Intellectual Property Administration, First Office Action and Search Report, Application No. 202080103474.2, Feb. 25, 2025, 11 pages.

UK Intellectual Property Office, Combined Search and Examination Report, Application No. GB1904948.5, Sep. 12, 2019, 3 pages.

PCT International Search Report and Written Opinion, PCT/GB2020/052040, May 19, 2021, 11 pages.

Intellectual Property India, First Examination Report, Application No. 202317019466, May 25, 2026, 9 pages.

* cited by examiner

MICROSCOPE

CROSS-REFERENCE TO RELATED APPLICATION

This patent application is a US national phase of pending International Patent Application No. PCT/GB2020/052040 filed on Aug. 25, 2020, and now published as WO 2022/043644. The disclosure of this International Patent Application is incorporated herein by reference.

BACKGROUND OF THE INVENTION

Technical Field

The present invention relates to an optical microscope. In particular, but not exclusively, the invention relations to a confocal optical microscope.

Related Art

Many conventional optical microscopes include a plurality of objective lenses with different magnification powers. The objective lenses are mounted in a turret, which allows them to be positioned alternately in the optical path of the microscope, allowing a sample to be viewed at different magnifications. This allows a user to identify an area of interest at a relatively low magnification and then view that area of interest at a higher magnification.

However, conventional optical microscopes of the type described above do not enable the sample to be viewed simultaneously at both magnifications, since only one objective lens can be located in the optical path at a time. Nor do they allow rapid switching between the high and low magnification images, for example to provide quasi-simultaneous viewing at both magnifications. These represent technical problems with known optical microscopes.

A similar problem arises with confocal microscopes, where an image is generated by scanning a sample using a high magnification objective, but where a low magnification objective may also be provided for orientation and to locate areas of interest in a sample. Again both objectives cannot be used at the same time, and therefore a high magnification image and a low magnification image cannot be captured simultaneously or quasi-simultaneously. This also represents a technical problem with known confocal microscopes.

In some confocal microscopes, light from a light source is focused onto a single spot on the sample, and light emanating from that spot (for example, by reflection or fluorescence) is then collected by an objective lens and focused onto a detector. By scanning the sample and detecting variations in the intensity of light from the sample, an image of the sample can be constructed. However, real time imaging is not possible owing to the requirement to scan the sample.

In an alternative confocal system, for example as described in U.S. Pat. No. 6,144,489, a mask is provided for encoding light incident on the sample and decoding light emanating from a plurality of regions of the sample. This generates a confocal image of the sample simultaneously with a non-confocal image. By subtracting the non-confocal image from the confocal image, out of focus blur can be removed providing an improved confocal image. However, this confocal system again suffers from the technical problems identified above, specifically in that it cannot capture a high magnification image and a low magnification image simultaneously.

A similar confocal microscope system is described in U.S. Pat. No. 6,687,052.

SUMMARY OF THE INVENTION

It is an object of the present invention to provide a microscope that overcomes or mitigates one or more of the aforesaid problems, or that provides a useful alternative thereto.

According to the present invention there is provided, a microscope comprising:

- a sample stage for mounting a sample;
- a light source for illuminating the sample when mounted on the sample stage;
- a detector;
- a first objective disposed on one side of the sample stage;
- a second objective disposed on an opposite side of the sample stage;
- a first set of optical elements defining a first light path from the first objective to the detector;
- a second set of optical elements defining a second light path from the second objective to the detector;
- wherein the first objective and the second objective have a common optical axis and are configured to image a sample mounted on the sample stage in a common focal plane,
- wherein the first objective is a high magnification objective and the second objective is a low magnification objective (i.e. the first objective has a higher magnification then the second objective).

The provision of such a microscope configuration enables a sample to be viewed simultaneously at both high and low magnifications and/or allows rapid switching between high and low magnification images, for example to provide quasi-simultaneous viewing at both magnifications.

The microscope may further include a beam splitter mounted in the first and second light paths. The beam splitter may include a semi-transparent mirror or a spatial light modulator comprising a plurality of transmissive and non-transmissive portions.

For example, the beam splitter may be in the form of a rotatable mask comprising a plurality of transmissive and non-transmissive portions. Such a beam splitter enables the first and second light paths to be split as they pass to the detector. This can be useful in a number of applications where a portion of the light beams is required to be selected and processed to generate a desired image.

For example, the non-transmissive portions of the spatial light modulator can be reflective and the spatial light modulator can be configured to split the first light path into a first transmitted light path and a first reflected light path, and to split the second light path into a second transmitted light path and a second reflected light path, where the first transmitted light path is congruent with the second reflected light path, and the first reflected light path is congruent with the second transmitted light path. The transmitted and reflected light paths can then be used to construct an image.

For example, the detector can include a first detector portion and a second detector portion, wherein the first detector portion is configured to receive transmitted light and to generate transmitted image data, and the second detector portion is configured to receive reflected light and to generate reflected image data, or the second detector portion is configured to receive transmitted light and to generate transmitted image data, and the first detector portion is configured to receive reflected light and to generate reflected image data.

In one configuration the first detector portion is configured to receive light from the first transmitted light path or the congruent second reflected light path, and the second detector portion is configured to receive light from the second transmitted light path or the congruent first reflected light path. The microscope may then further include an image processor connected to receive image data from the detector and configured to subtract the reflected image data from the transmitted image data to produce confocal image data for one or both of the first objective and the second objective. Such a configuration can enable laser-free confocal microscopy including simultaneous, or quasi-simultaneous, high and low magnification imaging.

In such arrangements, the light source may include an LED light for example.

Furthermore, the light source can be configured to direct light through the beam splitter towards the sample stage, for illuminating a sample mounted on the sample stage through the first objective and/or the second objective. This arrangement can provide a confocal system which has a functionality similar to that described in U.S. Pat. No. 6,144,489.

The beam splitter can function as a mask for encoding light incident on the sample and decoding light emanating from a plurality of regions of the sample. This generates a confocal image of the sample simultaneously with a non-confocal image. By subtracting the non-confocal image from the confocal image, out of focus blur can be removed providing an improved confocal image. However, in contrast to U.S. Pat. No. 6,144,489, the presently described confocal system can capture a high magnification image and a low magnification image simultaneously and/or quasi-simultaneously.

The microscope may further include a shutter mechanism for switching between the first objective and the second objective. A user can thus view either a low magnification image or a high magnification image, without making any other changes to the optical configuration of the microscope. This makes it very simple for the user to switch between a low magnification image for orientation, and a high magnification image of a specific area of interest within the sample. Also, by switching the shutter mechanism rapidly, a pair of high and low magnification images can be captured substantially quasi-simultaneously.

The first objective can be movable along an optical z-axis relative to the sample stage and the microscope can further include a z-stack controller which is configured to drive the first objective along the optical z-axis and capture a series of images as the first objective is driven along an optical z-axis. Such z-stack controllers are known. What is different here is that the z-stack controller is configured to capture the series of images while the first objective is in motion without requiring the first objective to be stopped as the images are being captured. This enables the time period to be significantly reduced for capturing a z-stack of images. For example, in one configuration, components of the sample stage itself only move in the x-y plane relative to the optical z-axis so as to move the sample in the x-y plane. A camera is driven along the z-axis, thus achieving the z stack with a continuous drive of the camera in the z direction.

The sample stage itself may include a transparent base on which the sample can be mounted, and a glide-push mechanism for sliding the sample around on a top-surface of the transparent base. This configuration enables the desired x-y motion of the sample while maintaining the desired z-positioning for the sample. It also enables the sample to be viewed through both objectives on either side of the sample stage.

The microscope may also include an integrated data storage unit for storing image data. A large quantity of image data can be generated very quickly by microscopes as described herein. As such, it has been found to be advantageous to provide an integrated data storage unit for storing the image data. This data may then be processed within the microscope and/or transmitted to an external device (e.g. a computing device such as a laptop, desktop computer, tablet, or smart phone) for image processing and/or viewing.

BRIEF DESCRIPTION OF THE DRAWINGS

Embodiments of the invention will now be described, by way of example, with reference to the accompanying drawings, in which.

DETAILED DESCRIPTION

Figure 1:
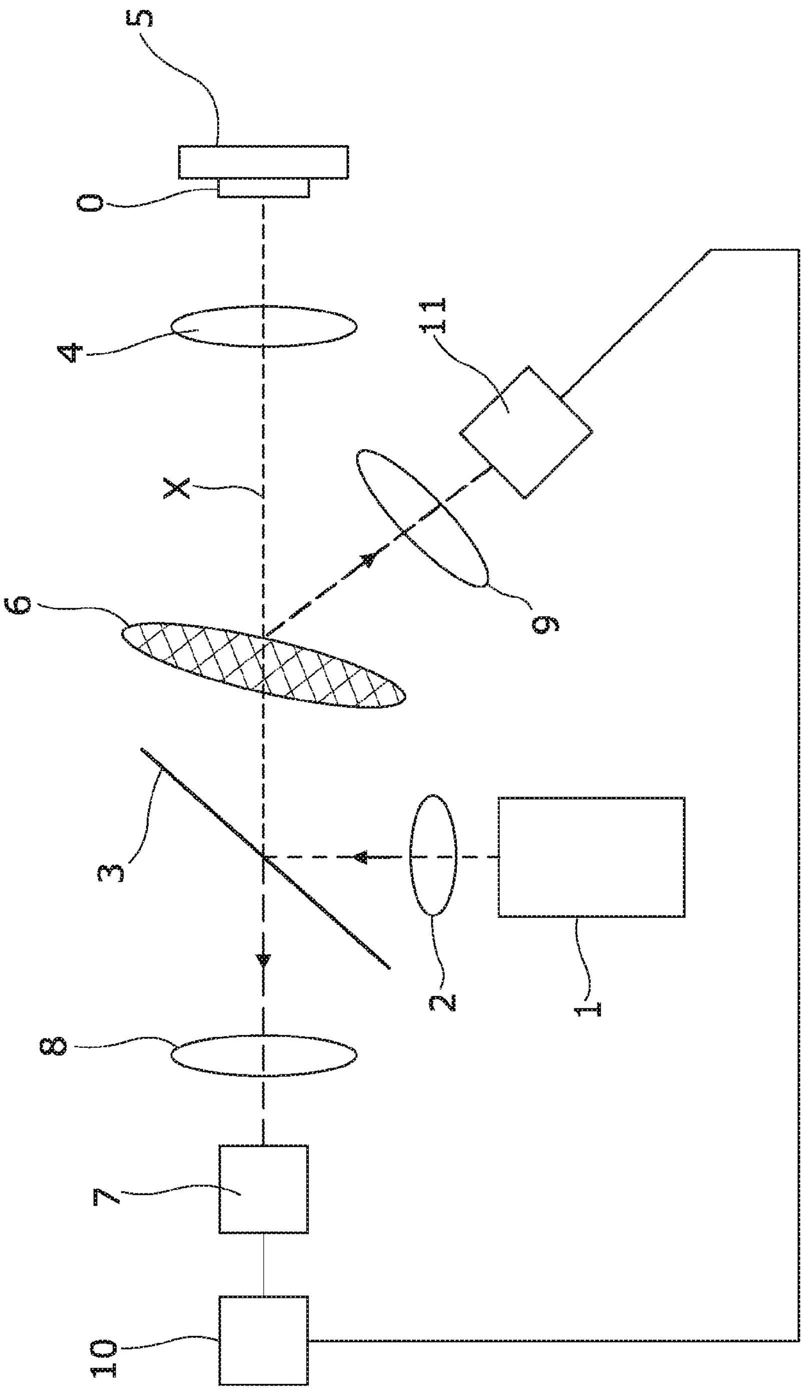
Fig. 1 (PRIOR ART)
FIG. 1 is a schematic diagram of a prior art confocal microscope apparatus.

FIG. 1 is a schematic diagram of a prior art confocal microscope apparatus as described in U.S. Pat. No. 6,687,052. The apparatus includes a light source 1 with an associated collimating lens 2, which directs light towards a beam splitter 3, for example a semi silvered mirror, a polarising beam splitter in combination with a quarter wave plate, or a dichroic beam splitter. Light is reflected from the beam splitter 3 through a mask 6 and a microscope objective lens 4 onto a sample O mounted on a sample stage 5.

The mask 6 includes a spatial modulator that modulates the light passing from the source 1 to the sample O. Typically the mask modulates the intensity of the light passing through it, however, it can alternatively modulate the phase or polarisation of the light.

In an embodiment the mask 6 includes a pattern of transmissive regions and opaque or reflective regions, which modulate the intensity of the light passing through the mask. The mask is configured to enable these transmissive and reflective regions to be moved around to adjust the pattern of illumination falling on the sample O. This can be achieved for example by providing the pattern of transmissive and reflective regions on a spinning disc. Alternatively, a spatial light modulator comprising an array of adjustable micromirrors may be used.

Light emitted from the sample O (for example by reflection or fluorescence) is captured by the objective lens 4 and focused back onto the mask 6. The light that passes through the transmissive portions of the mask 6 then passes through the beam splitter 3 and is focused by a lens 8 onto a first detector 7, for example a CCD detector. The first detector 7 captures a first image of the sample O.

The mask 6 is set at a small angle (for example a few degrees) to the optical axis X of the objective lens 4. As a result, light reflected from the reflective portions of the mask is focused by a lens 9 onto a second detector 11, which captures a second image of the sample.

The images captured by the first and second detectors 7, 11 are transmitted to an image processing device 10, which is configured to generate a composite image based on the images captured by the first and second detectors 7, 11.

In use, the light emanating from the sample O is focused back by the microscope objective 4 onto the mask 6, which transmits only the light falling on the transmissive areas of the mask. The transmitted image is captured by the first detector 7. The image captured by the first detector 7, which is referred to herein as the positive image, includes a combination of a conventional image Iconv superimposed with a confocal image Iconf, where the confocal image Iconf is produced from light emanating from the focal plane of the microscope objective 4.

At the same time, light emanating from other parts of the sample O, i.e. from other planes of the sample, is reflected by the reflective portions of the spatial pattern on the rear surface of the mask 6 and is focused onto the second detector 11. The second detector 11 thus captures a second image, referred to herein as the negative image, comprising a conventional image Iconv minus the confocal image Iconf.

The positive and negative images captured by the first and second detectors 7, 11 are transmitted to the image analyser 10 which subtracts the negative image from the positive image, i.e.:

$$(\text{Iconv}+\text{Iconf})-(\text{Iconv}-\text{Iconf}).$$

The resulting image is a confocal image from which the out of focus conventional image has been removed, as described in U.S. Pat. No. 6,687,052.

Figure 2:
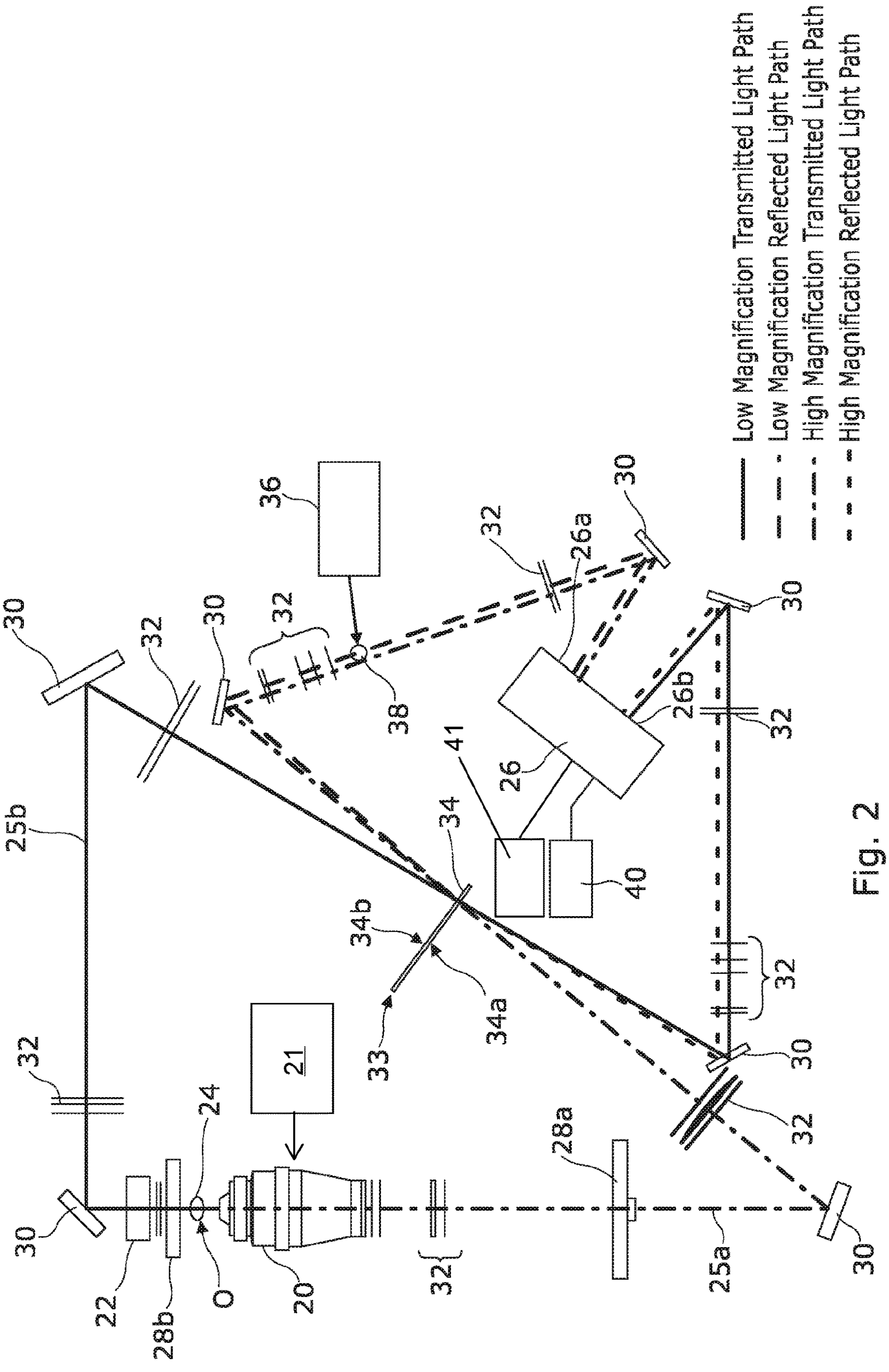
FIG. 2 is a schematic diagram of a first embodiment of a confocal microscope apparatus according to the present invention.

A confocal microscope according to an embodiment of the invention is shown in FIG. 2. As will be described in more detail below, the optical arrangement is broadly similar to that of the prior art confocal microscope shown in FIG. 1. However, in the present invention, two microscope objective lenses 20, 22 are provided, which are mounted on opposite sides of the sample holder 24, allowing two images of the sample to be captured simultaneously (or quasi-simultaneously), providing that the sample is at least partially transparent.

In one embodiment, the microscope objective lenses 20, 22 have different magnification powers, the first microscope objective lens 20 comprising a high magnification objective, and the second microscope objective lens 22 comprising a low magnification objective that provides a wide field of view. A z-stack controller 21 is configured and arranged to drive the first microscope objective lens 20 along the optical z-axis and capture a series of images as the first microscope objective lens 20 is driven along an optical z-axis.

In the embodiment shown in FIG. 2, a high magnification light path 25*a* from the high magnification objective 22 to a detector 26 is defined by a set of optical elements including, in this embodiment, a shutter 28*a*, mirrors 30, lenses 32 and a beam splitter 33 comprising a mask 34. In this embodiment the mask 34 includes a spinning disc having a pattern of transmissive and reflective regions. However, other types of mask, for example a spatial light modulator, could also be used.

Similarly, a low magnification light path 25*b* from the low magnification objective 22 to the detector 26 is defined by a set of optical elements including in this embodiment a shutter 28*b*, mirrors 30, lenses 32 and the mask 34.

It should be noted that both the high magnification light path 25*a* and the low magnification light path 25*b* pass through the mask 34 between the respective objective lenses 20, 22 and the detector 26.

It should also be noted that the arrangement of mirrors 30 and lenses 32 shown in FIG. 2 is purely illustrative and is not intended to be limiting. In practice, the layout of these components may be altered significantly without altering the functional operation of the microscope.

The confocal microscope also includes a light source 36, which introduces a beam of light along either the high magnification light path 25*a* or the low magnification light path 25*b*, for example via a beam splitter 38. In this embodiment light from the light source 36 is introduced along the high magnification light path at a location between the detector 26 and the mask 34. The light source 36 may for example be a low coherence light source, such as a light emitting diode (LED), an incandescent lamp or an arc lamp, or a coherent light source such as a laser.

In use, light from the light source 36 passes through the mask 34 and is focused by the high magnification objective 20 onto a focal plane within the sample O. As described previously in relation to the prior art microscope illustrated in FIG. 1, the light is encoded by the mask 34, creating a spatial pattern that is imaged onto the sample in the sample holder 24.

The encoded light emitted back from the sample O (for example, by reflection or fluorescence) is focused by the high magnification objective 20 onto the mask 34, which transmits only the light that falls on the transmissive areas of the mask. The transmitted image is captured on a first portion 26*a* of the detector 26. This is the positive image, which includes a conventional image Iconv superimposed with a confocal image Iconf, where the confocal image Iconf is produced from light emanating from the focal plane of the high magnification objective 20.

At the same time, light emanating from other parts of the sample O, i.e. not in the focal plane of the microscope objective 20, is reflected by the reflective portions of the spatial pattern of the mask 34 and is focused onto a second portion 26*b* of the detector 26. The detector 26 thus captures a negative image comprising a conventional image Iconv minus the confocal image Iconf.

The positive and negative images captured by the detector 26 are transmitted to an image analyser 40 which subtracts the negative image from the positive image, producing a high magnification confocal image from which the out of focus conventional image has been removed. An integrated data storage unit 41 is provided for storing image data.

Alternatively, a low magnification confocal image can be captured by detecting light that passes through the low magnification objective 22 and along the low magnification light path 25*b*. To capture a low magnification image, the first shutter 28*a* in the high magnification light path 25*a* is closed and the second shutter 28*b* in the low magnification light path 25*b* is opened.

The sample O is illuminated with light reflected from the second side 34*b* of the mask 34. As previously stated, the spatial pattern carried by the mask 34 includes a plurality of transmissive and reflective portions. The light reflected form the second side 34*b* is therefore encoded by the reflective portions in a similar manner to the way in which the light transmitted through the mask 34 is encoded by the transmissive portions. The encoded light reflected from the mask is focused onto the sample O by the low magnification objective 22, forming an image of the spatial pattern in a focal plane within the sample O. Preferably, the focal plane of the low magnification objective 22 is co-planar with the focal plane of the high magnification objective 20, so that both objectives 20, 22 image the same plane within the sample O.

The light emanating from the sample is focused by the low magnification objective 22 onto the mask 34, which transmits only the light that falls on the transmissive areas of the mask. The light that falls on the reflective portions of the mask is decoded by the spatial pattern of the mask. This light forms a low magnification positive image on the first portion 26*a* of the detector 26.

The light that is transmitted through the transmissive portions of the mask 34 is focused on the second portion 26*b* of the detector, forming a negative low magnification image. The positive and negative low magnification images are transmitted to the image analyser 40, which subtracts the negative image from the positive image, forming a low magnification confocal image from which the out of focus conventional image has been removed.

It will be apparent that by opening the first and second shutters 28*a*, 28*b* consecutively, a user can view either a low magnification confocal image or a high magnification confocal image, without making any other changes to the optical configuration of the microscope. This makes it very simple for the user to switch between a low magnification confocal image for orientation, and a high magnification confocal image of a specific area of interest within the sample. Also, by switching the first and second shutters 28*a*, 28*b* rapidly and alternately between the open and closed configurations, a pair of high and low magnification images can be captured substantially quasi-simultaneously.

Although the embodiment described above relates to a confocal microscope, the invention is also applicable to non-confocal microscopes, where it allows two different images of a sample, such as high and low magnification images, to be captured simultaneously or quasi-simultaneously. This can be achieved by replacing the spatial modulator that forms the mask 34 with a beam splitter, for example a semi-silvered mirror.

In such an arrangement, light from the source 36 falls on the beam splitter that includes the mask 34. Part of this light will be transmitted through the mask 34 and part will be reflected. The transmitted light will pass along the high magnification optical path to the high magnification objective 20, which will focus the light onto the sample O. Light emanating from the sample O will then be captured by the high magnification objective lens 20 and will pass through the mask 34 to be focused onto the first part 26*a* of the detector 26, forming a high magnification image of the sample O. Note that any light reflected from the mask 34 is not captured and the first image is a conventional image rather than a confocal image.

Similarly, low magnification image can be captured using the low magnification objective 22. To capture a low magnification image the first shutter 28*a* is closed to block light travelling along the high magnification light path 25*a*, and the second shutter 28*b* is opened, allowing light to travel along the low magnification light path 25*b*. The light reflected from the mask 34 will pass along the low magnification optical path 25*b* to the low magnification objective 22, which focuses the light onto the sample O. Light emanating from the sample O will then be captured by the low magnification objective lens 22 and will pass through the mask 34 to be focused onto the second part 26*b* of the detector 26, forming a low magnification image of the sample O. Again, this image is a conventional image rather than a confocal image.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A microscope comprising:

a sample stage configured to mount a sample;

a light source configured to illuminate any sample mounted on the sample stage;

a detector;

a first objective disposed on one side of the sample stage;

a second objective disposed on an opposite side of the sample stage;

a first set of optical elements defining a first light path from the first objective to the detector;

a second set of optical elements defining a second light path from the second objective to the detector;

wherein the first objective and the second objective have a common optical axis and are configured to image any sample mounted on the sample stage in a common focal plane, wherein the first objective is a high magnification objective and the second objective is a low magnification objective;

the microscope further comprising a beam splitter mounted in the first and second light paths, wherein the beam splitter comprises a spatial light modulator that includes a plurality of transmissive and non-transmissive portions.

2. A microscope according to claim 1, wherein the spatial light modulator comprises a rotatable mask that includes the plurality of transmissive and non-transmissive portions.

3. A microscope according to claim 1, wherein the non-transmissive portions of the spatial light modulator are reflective, wherein the spatial light modulator is configured to split the first light path into a first transmitted light path and a first reflected light path, and to split the second light path into a second transmitted light path and a second reflected light path, and wherein the first transmitted light path is congruent with the second reflected light path, and the first reflected light path is congruent with the second transmitted light path.

4. A microscope according to claim 3, wherein the detector includes a first detector portion and a second detector portion, wherein:

a) the first detector portion is configured to receive transmitted light and to generate transmitted image data, and the second detector portion is configured to receive reflected light and to generate reflected image data, or b) the second detector portion is configured to receive transmitted light and to generate transmitted image data, and the first detector portion is configured to receive reflected light and to generate reflected image data.

5. A microscope according to claim 4, wherein the first detector portion is configured to receive light from the first transmitted light path or the congruent second reflected light path, and the second detector portion is configured to receive light from the second transmitted light path or the congruent first reflected light path.

6. A microscope according to claim 5, wherein the microscope further comprises an image processor connected to receive image data from the detector, the image data including the reflected image data and the transmitted image data, and wherein the image processor is configured to subtract the reflected image data from the transmitted image data to produce confocal image data for one or both of the first objective and the second objective.

7. A microscope according to claim 6, wherein the light source is configured to direct light through the beam splitter towards the sample stage to illuminate any sample mounted on the sample stage through the first objective and/or through the second objective, and wherein the sample stage comprises a transparent base on which a sample can be mounted, and a glide-push mechanism configured to have the sample slide around on a top-surface of the transparent base.

8. A microscope according to claim 4, wherein the microscope further comprises an image processor connected to receive image data from the detector, wherein the image data includes the reflected image data and the transmitted image data, and wherein the image processor is configured to subtract the reflected image data from the transmitted image data to produce confocal image data for one or both of the first objective and the second objective.

9. A microscope according to claim 8, wherein the first objective is movable along an optical z-axis relative to the sample stage and the microscope comprises a z-stack controller that is configured to drive the first objective along the optical z-axis, wherein the detector is configured to capture a series of images as the first objective is driven along the optical z-axis, wherein the series of images is captured while the first objective is in motion without requiring the first objective to be stopped as the images are being captured.

10. A microscope according to claim 8, further comprising a shutter mechanism for switching between the first light path and the second light path, and wherein the light source is configured to direct light through the beam splitter towards the sample stage to illuminate any sample mounted on the sample stage through the first objective and/or through the second objective.

11. A microscope according to claim 10, wherein the first objective is movable along an optical z-axis relative to the sample stage and the microscope comprises a z-stack controller that is configured to drive the first objective along the optical z-axis, wherein the detector is configured to capture a series of images as the first objective is driven along the optical z-axis, wherein the series of images is captured while the first objective is in motion without requiring the first objective to be stopped as the images are being captured.

12. A microscope according to claim 10, wherein the sample stage comprises a transparent base on which any sample can be mounted, and a glide-push mechanism configured to have the sample slide around on a top-surface of the transparent base.

13. A microscope according to claim 8, wherein the sample stage comprises a transparent base on which any sample can be mounted, and a glide-push mechanism configured to have the sample slide around on a top-surface of the transparent base.

14. A microscope according to claim 1, further comprising a shutter mechanism for switching between the first light path and the second light path.

15. A microscope according to claim 1, wherein the light source is configured to direct light via the beam splitter towards the sample stage to illuminate any sample mounted on the sample stage, through the first objective and/or through the second objective.

16. A microscope according to claim 15, wherein light from the light source passing through the beamsplitter is directed towards the sample stage via the first objective and/or the light from the light source reflected by the beamsplitter is directed to the sample stage via the second objective.

17. A microscope according to claim 1, wherein the first objective is movable along an optical z-axis relative to the sample stage and the microscope comprises a z-stack controller that is configured to drive the first objective along the optical z-axis, wherein the detector is configured to capture a series of images as the first objective is driven along the optical z-axis, wherein the series of images is captured while the first objective is in motion without requiring the first objective to be stopped as the images are being captured.

18. A microscope according to claim 1, further comprising an integrated data storage unit configured to store image data.

19. A microscope according to claim 1, wherein the sample stage comprises a transparent base on which any sample can be mounted, and a glide-push mechanism configured to have a sample slide around on a top-surface of the transparent base.

* * * * *